(12) United States Patent
Tabb et al.

(10) Patent No.: US 10,036,498 B2
(45) Date of Patent: Jul. 31, 2018

(54) FLEXIBLE JOINT WITH SUPPORT

(71) Applicant: Eaton Corporation, Cleveland, OH (US)

(72) Inventors: Norman K. Tabb, Riverdale, MD (US); Daniel T. Munley, Owings, MD (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/372,025

(22) Filed: Dec. 7, 2016

(65) Prior Publication Data

US 2017/0167649 A1     Jun. 15, 2017

Related U.S. Application Data

(60) Provisional application No. 62/265,028, filed on Dec. 9, 2015, provisional application No. 62/265,012, filed on Dec. 9, 2015.

(51) Int. Cl.
| | |
|---|---|
| *F16L 27/04* | (2006.01) |
| *F16L 27/08* | (2006.01) |
| *F16L 27/02* | (2006.01) |

(52) U.S. Cl.
CPC .......... *F16L 27/0857* (2013.01); *F16L 27/02* (2013.01)

(58) Field of Classification Search
CPC ........ F16L 27/02; F16L 27/023; F16L 27/047
USPC ...................................... 285/264, 265, 226
See application file for complete search history.

(56) References Cited

U.S. PATENT DOCUMENTS

| | | | | |
|---|---|---|---|---|
| 3,112,129 | A | * 11/1963 | Willis | F16L 27/0857 285/226 |
| 3,551,010 | A | * 12/1970 | Halling | F16L 27/02 285/226 |
| 3,915,482 | A | 10/1975 | Fletcher et al. | |
| 4,480,857 | A | * 11/1984 | Graves | F16L 27/0857 285/226 |
| 4,643,463 | A | * 2/1987 | Halling | F16L 27/0857 285/226 |
| 4,645,244 | A | * 2/1987 | Curtis | F16L 27/0857 285/114 |
| 5,112,088 | A | * 5/1992 | Moore | F16L 27/0857 285/114 |
| 5,280,968 | A | * 1/1994 | Moore | F16L 27/0857 285/226 |
| 7,040,666 | B2 | * 5/2006 | Christianson | F02K 1/80 285/145.5 |
| 2014/0265310 | A1 | * 9/2014 | Halkyard | F16L 27/02 285/226 |

* cited by examiner

*Primary Examiner* — Aaron M Dunwoody
(74) *Attorney, Agent, or Firm* — Fishman Stewart PLLC

(57) ABSTRACT

A flexible joint includes a pair of generally tubular members and a ring (e.g., gimbal ring). The tubular members are pivotally connected to the ring by pivot pins such that the pivot axes of the tubular members is generally perpendicularly related to each other to form a hinge. A support structure may interconnect the pivot pins and may be configured to support the pivot pins across the joint to maintain a generally perpendicular hinge orientation. A conduit may connect the tubular members.

20 Claims, 3 Drawing Sheets

FLEXIBLE JOINT WITH SUPPORT

CROSS-REFERENCE TO RELATED APPLICATIONS

This application claims the benefit of U.S. Provisional Application No. 62/265,012, filed Dec. 9, 2015 and U.S. Provisional Application No. 62/265,028, filed Dec. 9, 2015, both of which are incorporated herein by reference.

TECHNICAL FIELD

The present disclosure relates to joints with a support, including a flexible joint, such as a gimbal joint, with a support.

BACKGROUND

With conventional flexible joints, such as a gimbal ring and pin joint, under some conditions deformation of the gimbal ring under load may cause rotation of the pins, which can cause an increase in stress on pinned hinges. Such considerations can lead to or necessitate an undesirable increase in the size of the gimbal ring components, such as the pins, to address or accommodate increased internal pressure of a duct. It is desirable to provide a flexible joint that, among other things, can maintain sufficient structural and operational integrity at in high pressure environments.

DETAILED DESCRIPTION

Figure 1:
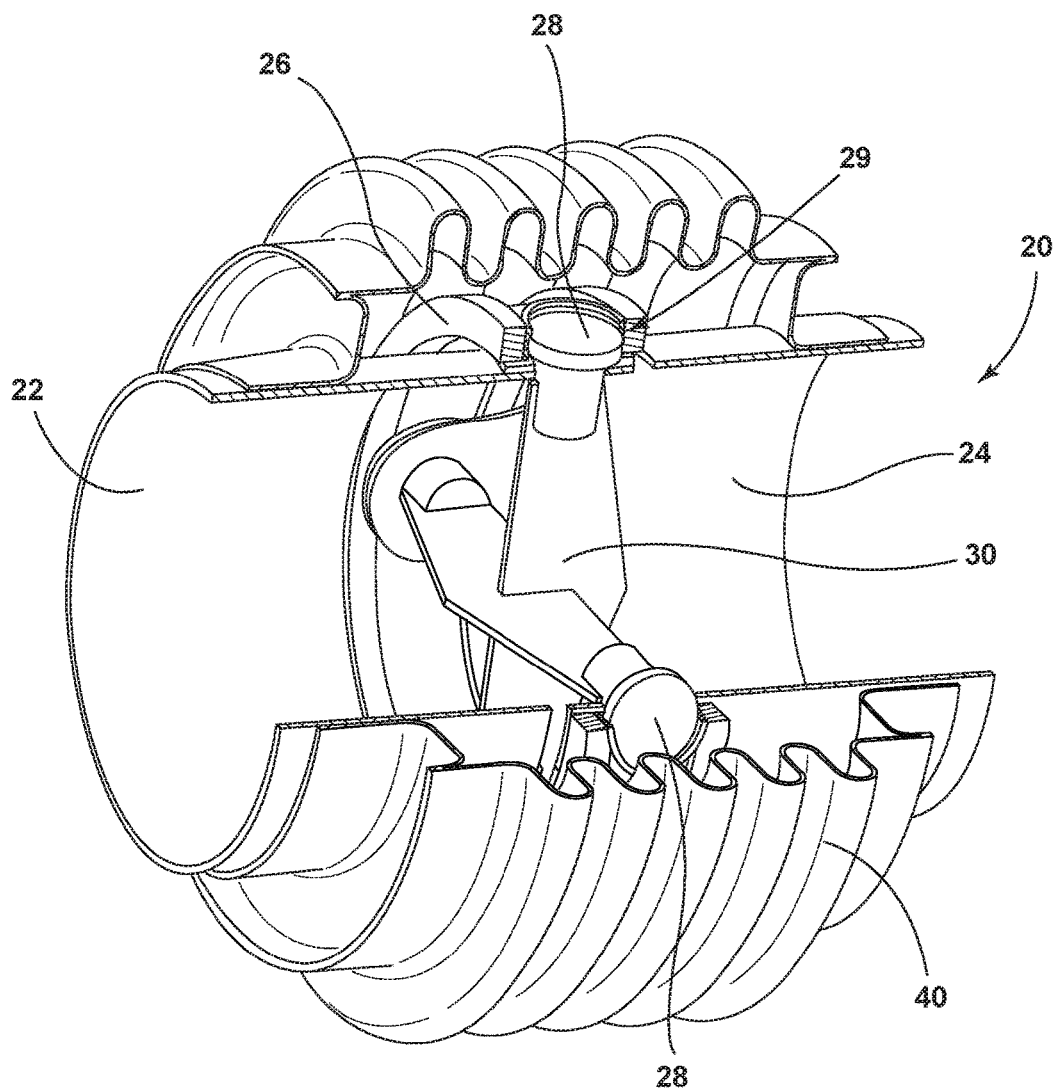
FIG. 1 is a partial cut-away perspective view of a flexible joint embodying teachings and aspects of an embodiment of the present disclosure.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, and/or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Referring to the drawings, which are not intended to limit the invention, FIG. 1 generally illustrates a flexible joint 20 embodying aspects and teachings of the disclosure. A flexible joint can, among other things, provide a pivoted support permitting the rotation of an object about an axis. Embodiments of a flexible joint 20 such as generally shown in FIG. 1 may be suitable for, instance, for use in a pressurized duct, such as an aerospace duct.

As generally illustrated in FIG. 1, a flexible joint 20 may include a first member and second member. In embodiments, the first and second member may comprise a pair of generally tubular members 22, 24 that are interconnected in a manner that permits the members 22, 24 to articulate relative to each other about a structure (e.g., a gimbal ring 26). As generally shown in the illustrated embodiment, a flexible joint 20 may include a gimbal ring 26 with four pivot pin members (or pivot member portions) 28 mounted to or otherwise disposed about the gimbal ring 26—e.g., at approximately 90 degree intervals about the circumference of the gimbal ring 26.

In embodiments, each of the tubular members 22, 24 may be configured to pivotally cooperate with two pivot pins 28 on the ring 26 that are in a diametrically-opposed relationship. With such a configuration, adjacent ends of tubular members 22, 24 attached to a common joint may be capable of pivoting about axes related 90 degrees to each other, and in a common plane, and a universal angular displacement between the tubular members in all directions is possible. In embodiments, the flexible joint 20 may be configured to effectively prevent relative axial displacement between adjacent tubular members 22, 24 under end loads.

With reference to the embodiment shown in FIG. 1, a flexible joint 20 may have a generally spherical interface 29 between a gimbal ring 26 and a hinge pin 28 (or pivot pin member). The generally spherical structure may permit the gimbal ring to deform under load without creating additional contact stresses and binding that could arise in a cylindrical connection from twisting or prying action in planes perpendicular to the tube axis.

As generally illustrated, a flexible joint 20 may include a support structure (which may also be referred to as an "internal bracing" or "cruciform") 30. The support structure 30 may be configured to connect or interconnect with a plurality of pins 28, and to support the pins across the joint 20 and may maintain a generally perpendicular hinge orientation. In embodiments, the support structure 30 may be configured to provide internal bracing and keep the structure of the joint sufficiently rigid, including at high pressures. With embodiments, the support structure 30 may span across the inside of the joint and stiffen an associated gimbal ring 26. The support structure 30 may be configured to reduce or inhibit relative rotational movement of the pins 28. With configurations, the internal bracing provided by the support structure 30 may permit the ring 26 to resist deformation of stresses imposed on the ring 26 more effectively than merely increasing the dimensions of the ring 26 and/or pins 28. While several embodiments of a support structure 30 are disclosed, embodiments of a support structure 30 may have a number of various other configurations or patterns.

The support structure 30 may be formed from various structural materials, including metals, plastics, composite materials and the like and may be affixed (e.g., welded, glued, mechanically connected and the like) to the pins. With some embodiments, the support structure 30 may comprise a single integral piece, two or more separate pieces joined proximate their center, or various other configurations having a plurality of pieces provided in combination. By way of example and without limitation, a support structure 30, such as depicted in FIG. 1, may comprise two components that interconnect (e.g. via complementary slots) to form a support structure 30. For some embodiments or applications, the support structure may be three-dimensionally printed, including using plastic and/or metallic material; although, higher temperature environments may necessitate use of metal materials.

For example, as generally illustrated, the tubular members 22, 24 connected or affixed to a common joint may be sealed or enclosed with respect to each other by a flexible conduit 40. In embodiments, a conduit 40 may comprise, for example, a metal bellows that is sealingly attached (e.g., welded) to the tubular members 22, 24. A conduit 40 may be configured to permit limited angular displacement between adjacent tubular members 22, 24 and to maintain the fluid tight integrity of the duct system. As the flexible joint 20 substantially absorbs all of the axial forces imposed upon the tubular members 22, 24, in embodiments a flexible conduit 40 may not be required to have a comparatively high strength resistance to axial forces, and may only need to be configured to effectively withstand internal fluid pressures.

Figure 2:
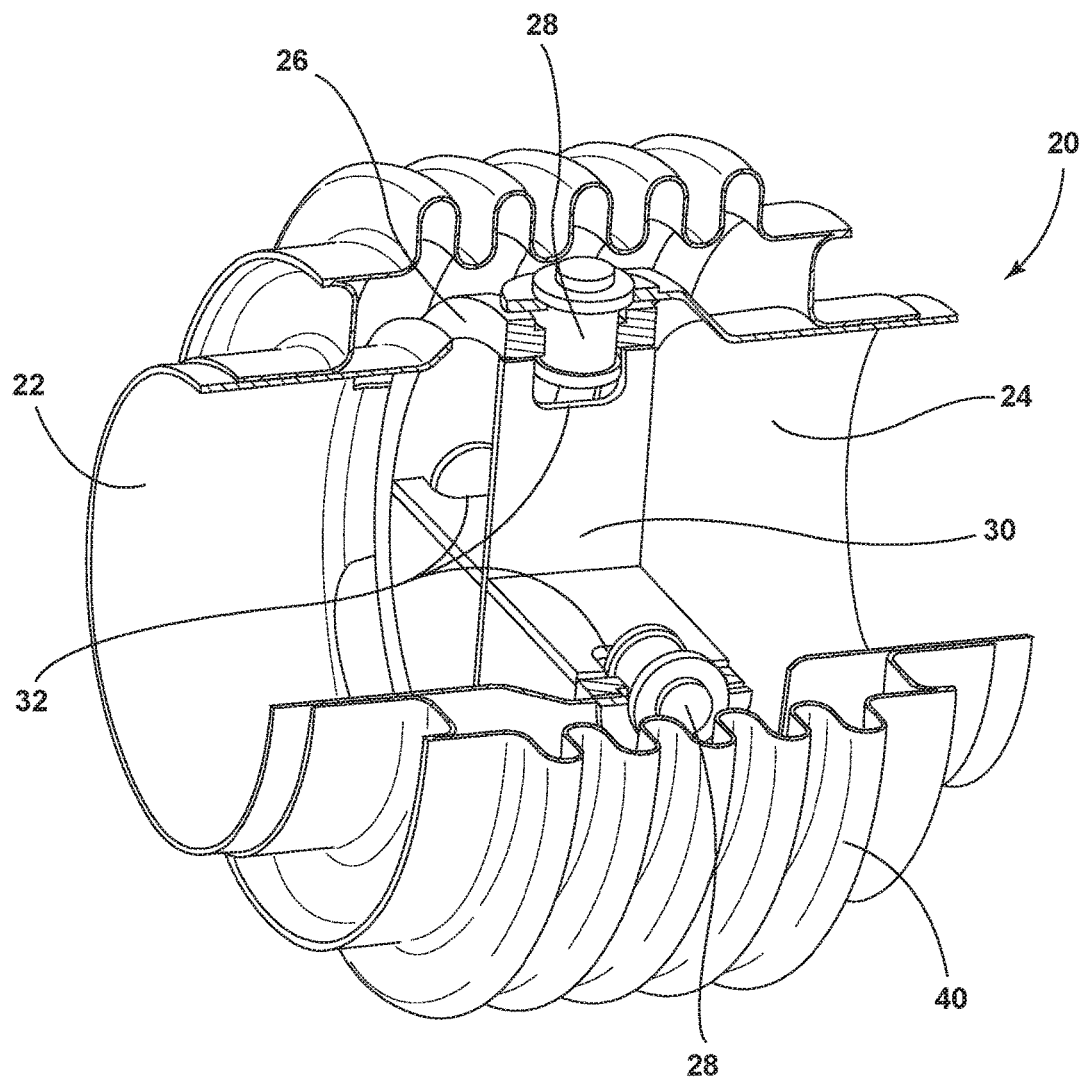
FIG. 2 is a partial cut-away perspective view of a flexible joint embodying teachings and aspects of another embodiment of the present disclosure.
Figure 3:
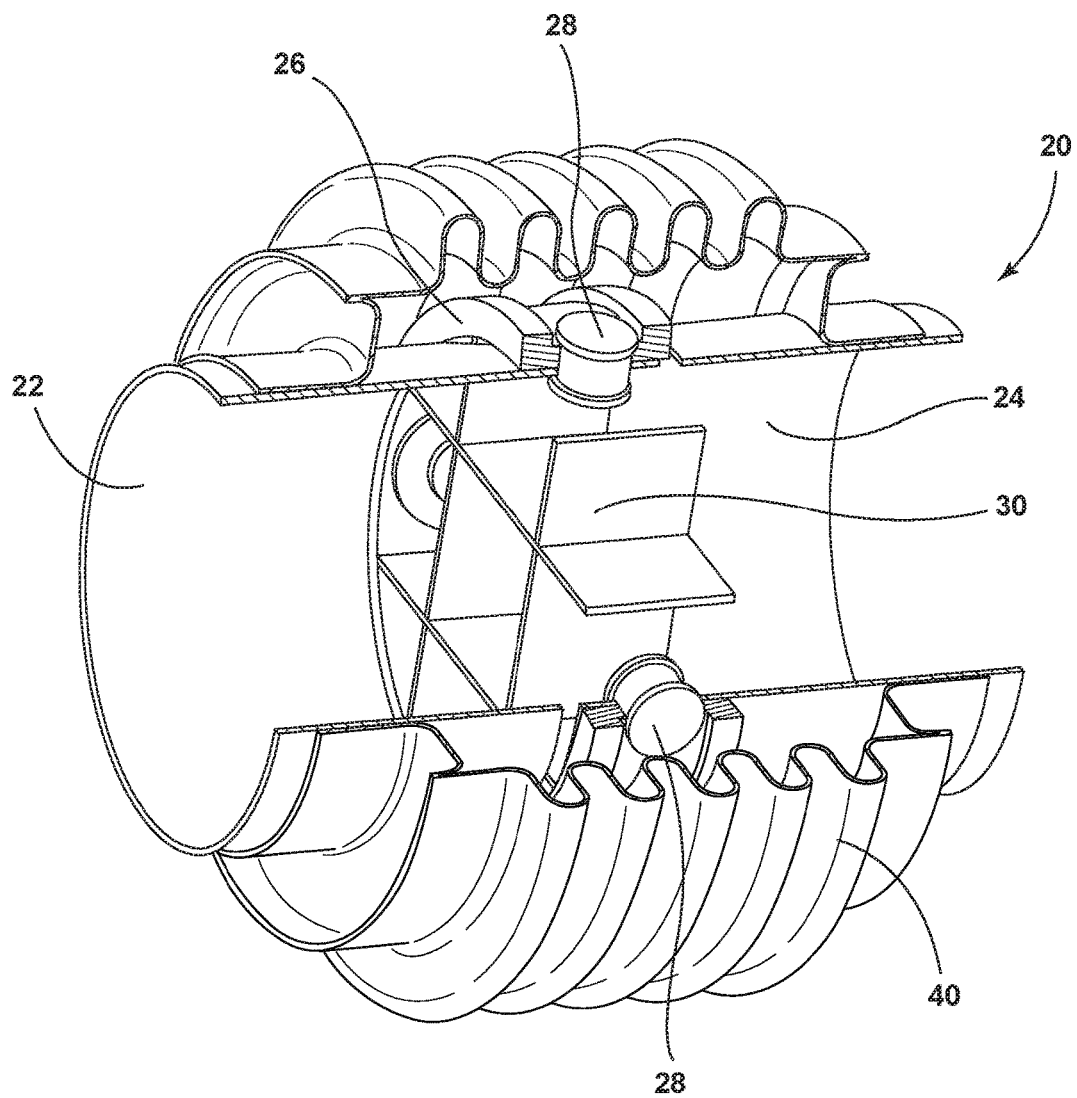
FIG. 3 is a partial cut-away perspective view of a flexible joint embodying teachings and aspects of another embodiment of the present disclosure.

Further embodiments of flexible joints 20 are generally illustrated in FIGS. 2 and 3. Referring to FIG. 2, another embodiment of a support structure 30 is included. As illustrated in this embodiment, the portions of the structure 30 that extend outwardly at 90 degree positions may form a cross pattern or "X" and may have substantially similar thickness along their radially extending portions, and may include an open or cut-out portion 32 adjacent the ring 26 and pin 28. FIG. 3 generally illustrates an embodiment of a support structure 30 having a lattice pattern. With such a lattice-type pattern, portions of the pins 28 may be positioned or disposed between extended portions of the support structure 30.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," "with embodiments" or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed:

1. A flexible joint comprising:
   a first generally tubular member;
   a second generally tubular member;
   an annular ring, wherein the first and second generally tubular members are pivotally connected to the ring by pivot pins, a first pivot axis associated with the first tubular member and a second pivot axis associated with the second tubular member are substantially perpendicular to each other and form a hinge, and the annular ring extends radially outward to a further radial extent than the pivot pins;

a support structure, wherein portions of the support structure extend across an inside of the joint and provide support to the ring; and a conduit enclosing ends of the first and second tubular members.

2. The flexible joint of claim 1, wherein the ring comprises a gimbal ring.

3. The flexible joint of claim 1, support structure interconnects the pivot pins and supports the pins across the joint to maintain a generally perpendicular hinge orientation.

4. The flexible joint of claim 1, wherein the flexible joint includes a spherical interface between the ring and the pivot pins.

5. The flexible joint of claim 1, wherein the conduit comprises a flexible conduit.

6. The flexible joint of claim 1, wherein the support structure is integral with the ring.

7. The flexible joint of claim 1, wherein the support structure is formed as a single unitary component.

8. The flexible joint of claim 1, wherein the support structure is comprised of a plurality of components formed or combined together.

9. The flexible joint of claim 1, wherein the support structure is comprised of at least two interconnected pieces.

10. The flexible joint of claim 1, wherein the support structure comprises at least two pieces that are joined, welded, glued, or mechanically connected or affixed together.

11. The flexible joint of claim 1, wherein the tubular members are configured to pivot about the first pivot axis and a second axis positioned at 90 degrees to each other, and in a common plane.

12. The flexible joint of claim 1, wherein the support structure is comprised of metal.

13. The flexible joint of claim 1, wherein the support structure is comprised of plastic.

14. The flexible joint of claim 1, wherein the support structure is comprised of composite materials.

15. The flexible joint of claim 1, wherein the support structure includes a cut-out portion adjacent the pivot pins.

16. The flexible joint of claim 1, wherein the conduit permits angular displacement between adjacent tubular members.

17. The flexible joint of claim 16, wherein the conduit maintains fluid-tight integrity of the joint.

18. A flexible joint comprising:
a first generally tubular member;
a second generally tubular member;
a gimbal ring, wherein the first and second generally tubular members are pivotally connected to the gimbal ring by pivot pins, and a first pivot axis associated with the first tubular member and a second pivot axis associated with the second tubular member are substantially perpendicular to each other and form a hinge;
a support structure including a lattice pattern, wherein portions of the support structure extend across an inside of the joint and provide support to the gimbal ring; and
a conduit enclosing ends of the first and second tubular members.

19. The flexible joint of claim 18, wherein the conduit comprises a flexible conduit.

20. A flexible joint comprising:
a first generally tubular member;
a second generally tubular member;
an annular ring, wherein the first and second generally tubular members are pivotally connected to the ring by pivot pins, and a first pivot axis associated with the first tubular member and a second pivot axis associated with the second tubular member are substantially perpendicular to each other and form a hinge;
a support structure, wherein the support structure comprises a lattice pattern, and portions of the support structure extend across an inside of the joint and provide support to the ring; and
a conduit enclosing ends of the first and second tubular members.

* * * * *